United States Patent
Cho et al.

(10) Patent No.: US 12,202,467 B2
(45) Date of Patent: Jan. 21, 2025

(54) HYBRID ELECTRIC VEHICLE AND DRIVING MODE CONTROL METHOD AND APPARATUS FOR SAME

(71) Applicants: Hyundai Motor Company, Seoul (KR); Kia Corporation, Seoul (KR)

(72) Inventors: Jin Kyeom Cho, Suwon-Si (KR); Sung Deok Kim, Seongnam-Si (KR); Ku Young Kang, Seoul (KR); Seong Wook Moon, Seoul (KR); Sung Chan Na, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 242 days.

(21) Appl. No.: 17/977,802

(22) Filed: Oct. 31, 2022

(65) Prior Publication Data

US 2024/0001909 A1    Jan. 4, 2024

(30) Foreign Application Priority Data

Jun. 30, 2022 (KR) .................. 10-2022-0080677

(51) Int. Cl.
     *B60W 20/40*      (2016.01)
     *B60K 35/00*      (2024.01)
     (Continued)

(52) U.S. Cl.
     CPC ............. *B60W 20/40* (2013.01); *B60K 35/00* (2013.01); *B60W 10/06* (2013.01); *B60W 10/08* (2013.01);
     (Continued)

(58) Field of Classification Search
     CPC ...... B60W 20/15; B60W 20/00; B60W 20/40; B60W 10/06; B60W 10/08;
     (Continued)

(56) References Cited

U.S. PATENT DOCUMENTS

| | | | | |
|---|---|---|---|---|
| 2003/0004635 A1* | 1/2003 | Kamiya | .............. | F02N 11/0837 477/203 |
| 2004/0214689 A1* | 10/2004 | Kaneko | ................. | F02D 41/042 477/203 |
| 2009/0308674 A1* | 12/2009 | Bhattarai | ............. | B60W 10/06 180/65.265 |
| 2010/0250039 A1* | 9/2010 | Bryan | ................. | F02N 11/0829 903/930 |

(Continued)

FOREIGN PATENT DOCUMENTS

| | | | | |
|---|---|---|---|---|
| CN | 106907251 B | * | 4/2020 | ............ F02D 17/04 |
| CN | 114291064 A | * | 4/2022 | |

(Continued)

OTHER PUBLICATIONS

Translation of CN-106907251-B retrieved from Espacent on Aug. 21, 2024 (Year: 2024).*

(Continued)

*Primary Examiner* — Thomas Ingram
*Assistant Examiner* — Faris Asim Shaikh
(74) *Attorney, Agent, or Firm* — Morgan, Lewis & Bockius LLP

(57) ABSTRACT

Provided are a hybrid electric vehicle and driving mode control method and apparatus for the same. An engine start request is generated by a heating controller of the vehicle. A second time is determined on basis of a first time between the cancellation of a prevent engine start request and the generation of the engine start request. The engine is controlled so that the engine is further maintained in a started state during the second time after the engine start request is cancelled.

19 Claims, 7 Drawing Sheets

(51) Int. Cl.
*B60K 35/28* (2024.01)
*B60W 10/06* (2006.01)
*B60W 10/08* (2006.01)

(52) U.S. Cl.
CPC ........ *B60K 35/28* (2024.01); *B60K 2360/172* (2024.01); *B60W 2710/06* (2013.01)

(58) Field of Classification Search
CPC ......... B60W 2710/06; B60W 50/0098; B60W 2050/0075; B60W 2510/0676; B60W 10/02; B60W 20/20; B60W 50/06; F02N 11/0833; F02N 11/0822; F02N 11/0818; F02N 11/0829; F02N 11/0825; F02N 11/0837; F02N 11/0844; F02N 11/0848; F02N 11/08; F02N 11/00; F02N 11/14; F02N 2300/00; F02N 2300/2002; F02N 2300/2008; F02N 2300/2006; F02N 2300/2004; F02N 2300/304; F02N 2300/302; F02N 2300/30; F02N 2200/00; F02N 2200/02; F02N 2200/023; F02N 2200/024; F02N 2200/026; F02N 2200/061; F02N 2200/062; F02N 2200/063; F02N 2200/064; F02N 2200/066; F02N 2200/045; F02N 2200/104; F02N 2200/105; F02N 2200/106; F02N 2200/101; F02N 2200/10; F02N 2200/06; F02N 2200/122; F02D 2200/50; F02D 2200/503; Y02T 10/40; Y02T 10/12; Y02T 10/62; Y02T 10/72; B60R 25/04; B60R 2025/041; B60R 25/045; B60Y 2200/92; B60Y 2300/43; B60K 6/20; B60K 6/24; B60K 6/442; B60K 35/00; B60K 35/28; B60K 2360/172; B60K 2006/4825; B60K 6/48
See application file for complete search history.

(56) References Cited

U.S. PATENT DOCUMENTS

| | | | |
|---|---|---|---|
| 2011/0174255 A1* | 7/2011 | Neuburger | B60L 50/16 123/179.4 |
| 2012/0247411 A1* | 10/2012 | Stewart | F01L 1/34 123/90.17 |
| 2013/0152894 A1* | 6/2013 | To | F02M 31/13 123/179.21 |
| 2014/0136087 A1 | 5/2014 | Kamatani | |
| 2014/0156132 A1* | 6/2014 | Ichimoto | B60W 10/26 180/65.265 |
| 2015/0197243 A1* | 7/2015 | Johri | B60W 10/10 180/65.265 |
| 2015/0252735 A1* | 9/2015 | Orita | F01L 1/344 123/179.4 |
| 2015/0298677 A1* | 10/2015 | Reed | B60W 10/06 477/3 |
| 2016/0082944 A1* | 3/2016 | Park | B60W 20/40 180/65.265 |
| 2016/0221570 A1* | 8/2016 | Chen | B60W 30/1882 |
| 2018/0162357 A1* | 6/2018 | Sim | B60W 20/12 |
| 2019/0309702 A1* | 10/2019 | Kato | F02D 35/028 |
| 2022/0290646 A1* | 9/2022 | Ord | F02P 5/045 |
| 2022/0349371 A1* | 11/2022 | Zhao | B60K 6/387 |

FOREIGN PATENT DOCUMENTS

| | | |
|---|---|---|
| JP | 2005-147050 | 6/2005 |
| JP | 2007-196785 | 8/2007 |
| JP | 2013-086728 | 5/2013 |
| JP | 2019-093989 | 6/2019 |
| KR | 10-2017-056923 | 5/2017 |
| KR | 10-1807061 | 12/2017 |

OTHER PUBLICATIONS

Translation of CN-114291064-A retrieved from Espacent on Aug. 21, 2024 (Year: 2024).*

* cited by examiner

HYBRID ELECTRIC VEHICLE AND DRIVING MODE CONTROL METHOD AND APPARATUS FOR SAME

CROSS REFERENCE TO RELATED APPLICATION

The present application claims priority to Korean Patent Application No. 10-2022-0080677, filed on Jun. 30, 2022, the entire contents of which is incorporated herein for all purposes by this reference.

BACKGROUND OF THE PRESENT DISCLOSURE

Field of the Present Disclosure

The present disclosure relates generally to an electrified vehicle and driving mode control method and apparatus for the same, wherein the cycle of change in the driving mode of a hybrid electric vehicle is adjustable according to the cycle of an engine start request of a heating controller.

Description of Related Art

Recently, with growing interest in the environment, ecofriendly vehicles each having an electric motor as a power source are increasing. Ecofriendly vehicles are also referred to as electrified vehicles to which an electric vehicle (EV), a hybrid electric vehicle (HEV), a plug-in hybrid electric vehicle (PHEV), a fuel cell electric vehicle (FCEV), and the like belong.

Because such an electrified vehicle is provided with a motor differently from a conventional internal combustion engine (ICE) vehicle, the electrified vehicle may obtain power required for propulsion using the motor. A hybrid electric vehicle, such as an HEV or a PHEV, provided with an engine together with a motor may use both the engine and the motor as power sources, and use a variety of driving modes having different power transmission states according to the situation.

Such driving modes may include an EV mode in which only the drive motor is used as a power source, an HEV mode in which the drive motor is selectively used while the engine is being driven, and the like. Here, the HEV mode may be further divided into an HEV-series mode in which a hybrid starter generator (HSG) charges with power from the engine and driving force from the drive motor is transmitted to wheels and an HEV-parallel mode in which power from the engine is transmitted to wheels of the vehicle. Some vehicles are provided with an EV+ mode in which the conversion to the HEV mode is difficult and the EV mode is more actively used. The driving mode may be selected directly by the driver, or may be automatically converted to match a driving load and a driving situation.

Meanwhile, a vehicle is generally heated through air conditioning in which cooling water heated through the actuation of the engine is used. In the EV mode, the cooling water is not heated since the engine is not started and power is only supplied by the motor. Thus, the EV mode is disadvantageous in terms of heating.

To solve the present problem, conventional approaches are configured to forcibly convert the driving mode to the HEV mode in which the engine is started when the temperature of cooling water is lower than a target temperature of heating and return the driving mode to the original state when the temperature of the cooling water is sufficiently increased after the conversion. Furthermore, when the driving mode returns to the original state, an alarm using a cluster pop-up, sound, or the like is provided to inform a driver or an occupant that the driving mode is returned to the original state.

However, when the outside temperature is significantly low and the cooling water is rapidly cooled while driving of the vehicle, the forced conversion of the driving mode is repeated in a short cycle. Consequently, there is a problem in that the alarm of the conversion of the driving mode may also be frequently generated, causing the driver inconvenience and distracting the driver driving the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid electric vehicle and driving mode control method and apparatus for the same, wherein, when an engine start request for heating is repeatedly generated and cancelled while a vehicle is driving, the start of the engine may be controlled based on not only the generation and cancellation of the engine start request but also the cycle of the engine start request, causing the cycle of conversion of a driving mode to be adjustable.

The objective of the present disclosure is not limited to the aforementioned description, and other objectives not explicitly included herein will be clearly understood by those skilled in the art from the description provided hereinafter.

To achieve at least one of the above objectives, according to one aspect of the present disclosure, there is provided a driving mode control method of a hybrid electric vehicle, the method including: when an engine start request is generated by a heating controller of the vehicle while the vehicle is driving in a state in which an engine of the vehicle is not started, determining a second time on basis of a first time between cancellation of a previous engine start request and the generation of the engine start request; and controlling the engine so that the engine is further maintained in a started state during the second time after the cancellation of the engine start request.

The determination of the second time may include determining the second time to increase with decreases in the first time.

The method may further include, when the engine start request is generated by the heating controller, converting a driving mode of the vehicle to a predetermined mode in which the engine is started. The controlling of the engine may include maintaining the engine in the started state by the predetermined mode during the second time.

The maintaining of the engine in the started state by the predetermined mode may be performed in a first mode in which a starter/generator motor of the vehicle charges with power from the engine during the second time.

The maintaining of the engine in the started state by the predetermined mode may include raising a reference of entry to a second mode in which driving force from the engine is transmitted to wheels of the vehicle.

The method may further include stopping the engine when the second time has passed after the engine start request generated by the heating controller is cancelled.

The method may further include: when the engine is started at the engine start request generated by the heating controller, displaying engine start information including at least one of an engine start reason, a current driving mode, or a combination thereof; and maintaining the displaying of the engine start information during the second time after the engine start request is cancelled.

To achieve at least one of the above objectives, according to another aspect of the present disclosure, there is provided a driving mode control apparatus for a hybrid electric vehicle, the apparatus including: a determining portion configured for determining a second time on basis of a first time between cancellation of a previous engine start request and generation of an engine start request when the engine start request is generated by a heating controller of the vehicle while the vehicle is driving in a state in which an engine of the vehicle is not started; and a control portion configured for controlling the engine so that the engine is further maintained in a started state during the second time after the cancellation of the engine start request.

The determining portion may determine the second time to increase with decreases in the first time.

The control portion may convert the driving mode to a predetermined mode in which the engine is started when the engine start request is generated by the heating controller, and maintains the engine in the started state by the predetermined mode during the second time.

The predetermined mode may be a first mode in which a starter/generator motor performs a charging operation using power from the engine during the second time.

The control portion may maintain the engine in the started state by the first mode by raising a reference of entry to a second mode in which driving force from the engine is transmitted to wheels of the vehicle.

The control portion may stop the engine when the second time has passed after the engine start request generated by the heating controller is cancelled.

To achieve at least one of the above objectives, according to another aspect of the present disclosure, there is provided a hybrid electric vehicle including: a powertrain apparatus including an engine; a heating controller configured for controlling generation or cancellation of an engine start request on basis of the temperature of cooling water; and a driving mode control apparatus configured for controlling the powertrain apparatus. The driving mode control apparatus may include: a determining portion configured for determining a second time on basis of a first time between cancellation of a previous engine start request and generation of an engine start request when the engine start request is generated by the heating controller of the vehicle while the vehicle is driving in a state in which an engine of the vehicle is not started; and a control portion configured for controlling the engine so that the engine is further maintained in a started state during the second time after the cancellation of the engine start request.

The hybrid electric vehicle may further include a display portion displaying engine start information including at least one of an engine start reason, a current driving mode, or a combination thereof. The display portion may maintain displaying the engine start information during the second time after the engine start request is cancelled.

The hybrid electric vehicle and the driving mode control method and apparatus for the same according to an exemplary embodiment of the present disclosure can prevent the driving mode from being frequently converted in a short time period.

Accordingly, it is possible to prevent the problem in that the popping-up of the cluster, sound, or the like caused by the conversion of the driving mode may distract the concentration of the driver or cause the driver inconvenience. In the present manner, the satisfaction of use of the hybrid electric vehicle may be increased, and the product quality of the hybrid electric vehicle may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
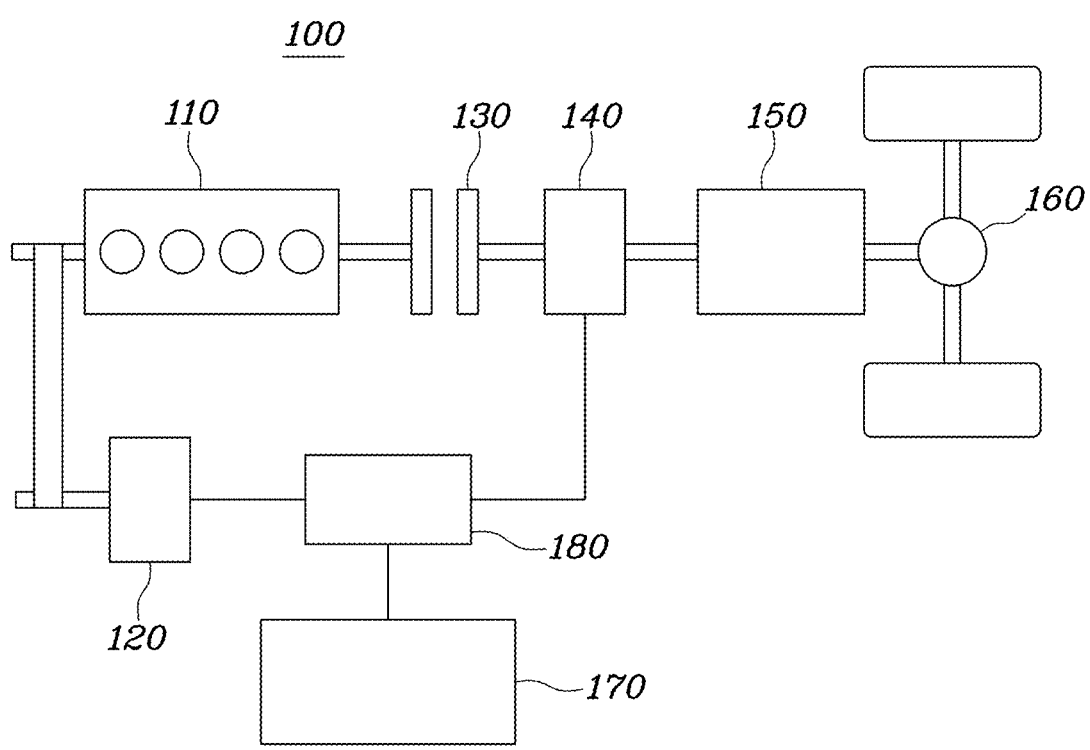
FIG. 1 is a schematic view exemplarily illustrating an example of a powertrain apparatus configuration of a hybrid electric vehicle applicable to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural and functional descriptions of embodiments of the present disclosure disclosed herein are only for illustrative purposes of the exemplary embodiments of the present disclosure. The present disclosure may be embodied in various forms without departing from the spirit and significant characteristics of the present disclosure. Therefore, the exemplary embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, because the exemplary embodiments of the present disclosure may be variously modified in various forms. While the present disclosure will be described in conjunction with exemplary embodiments thereof, it is to be understood that the present description is not intended to limit the present disclosure to those exemplary embodiments of the present disclosure. On the other hand, the present disclosure is directed to cover not only the exemplary embodiments of the present disclosure, but also various alternatives, modifications, equivalents and other embodiments which may be included within the spirit and scope of the present disclosure as defined by the appended claims.

Unless otherwise defined, all terms including technical and scientific terms used herein have the same meaning as commonly understood by those skilled in the art to which the present disclosure belongs. It will be further understood that terms, such as those defined in commonly used dictionaries, should be interpreted as including a meaning which is consistent with their meaning in the context of the relevant art and the present disclosure, and will not be interpreted in an idealized or overly formal sense unless expressly so defined herein.

Hereinafter, embodiments included in the present disclosure will be described in detail with reference to the accompanying drawings, in which identical or similar constituent elements are provided the same reference numerals regardless of the reference numerals of the drawings, and repeated description thereof will be omitted.

The component suffixes "module" and "part" used in the following description are provided or mixed together only considering the ease of generating the specification, and have no meanings or roles that are distinguished from each other by themselves.

In the description of the present disclosure, when it is determined that the detailed description of related art would obscure the gist of the present disclosure, the detailed description thereof will be omitted. Furthermore, the appended drawings are merely intended to be able to readily understand the exemplary embodiments disclosed herein, and thus the technical idea disclosed herein is not limited by the appended drawings, and it should be understood to include all changes, equivalents, and substitutions included in the idea and technical scope of the present disclosure.

It will be understood that, although the terms "first", "second", etc., may be used herein to describe various elements, these elements should not be limited by these terms. These terms are only used to distinguish one element from another element.

It will be understood that when an element is referred to as being "coupled", "connected", or "linked" to another element, it may be directly coupled or connected to the other element or intervening elements may be present therebetween. In contrast, it should be understood that when an element is referred to as being "directly coupled", "directly connected", or "directly connected" to another element, there are no intervening elements present.

As used herein, the singular forms "a", "an", and "the" are intended to include the plural forms as well, unless the context clearly indicates otherwise.

It will be further understood that the terms "comprise", "include", "have", etc., when used in the present specification, specify the presence of stated features, integers, steps, operations, elements, components, and/or combinations thereof but do not preclude the presence or addition of one or more other features, integers, steps, operations, elements, components, and/or combinations thereof.

Furthermore, an expression "unit" or "control unit" included in a term, such as a motor control unit (MCU) or a hybrid control unit (HCU), is only a term widely used in the naming of a controller controlling a specific function of a vehicle, but may not be understood as a generic function unit.

The controller may include: a communication device communicating with another controller or a sensor to control a corresponding function to which the controller is in charge; a memory storing an operating system (OS), logic commands, input/output information, and the like; and one or more processors performing determination, determination, decision, and the like required for the control of the corresponding function.

Prior to description of a driving mode control method of a hybrid electric vehicle according to various exemplary embodiments of the present disclosure, the structure and control system of a hybrid electric vehicle applicable to various exemplary embodiments will be described.

FIG. 1 is a schematic view exemplarily illustrating an example of a powertrain apparatus configuration of a hybrid electric vehicle applicable to various exemplary embodiments of the present disclosure. Referring to FIG. 1, a powertrain apparatus 100 of the hybrid electric vehicle provided with an electric motor (or a drive motor) 140 and an engine clutch 130 between an internal combustion engine (ICE) 110 and a transmission 150 is illustrated.

In the present vehicle, after the vehicle is turned on, when a driver presses the accelerator pedal (i.e., in an accelerator pedal ON state), the motor 140 is first driven using power from a battery in a situation in which the engine clutch 130 is disengaged, and power from the motor is transmitted to wheels through the transmission 150 and a final drive (FD) 160 to drive the wheels (i.e., an EV mode). When greater driving force is required in response to gradual acceleration of the vehicle, the engine 110 may be driven by operating a starter/generator motor (or an auxiliary motor) 120.

Consequently, when the difference in the number of revolutions between the engine 110 and the motor 140 is within a predetermined range, the engine clutch 130 is engaged to connect the engine 110 and the motor 140, allowing both the engine 110 and the motor 140 to propel the vehicle (i.e., transition from the EV mode to an HEV mode). When a predetermined engine off condition is met, for example, the vehicle is decelerated, the engine clutch 130 is disengaged and the engine 110 is stopped (i.e., transition from the HEV mode to the EV mode). At the instant time, the vehicle charges a battery 170 with electricity generated by the motor 140 using driving force of the wheels. This is referred to as braking energy regeneration or regenerative braking. In the present manner, the starter/generator motor 120 is configured as a starter motor when the engine is started. When rotational energy of the engine is recovered after the engine is started or when the engine is stopped, the starter/generator motor 120 operates as a generator. Thus, the starter/generator motor 120 may be referred to as a hybrid starter generator (HSG).

In general, the transmission 150 may be a stepped transmission or a multi-plate clutch, e.g., a dual clutch transmission (DCT).

Figure 2:
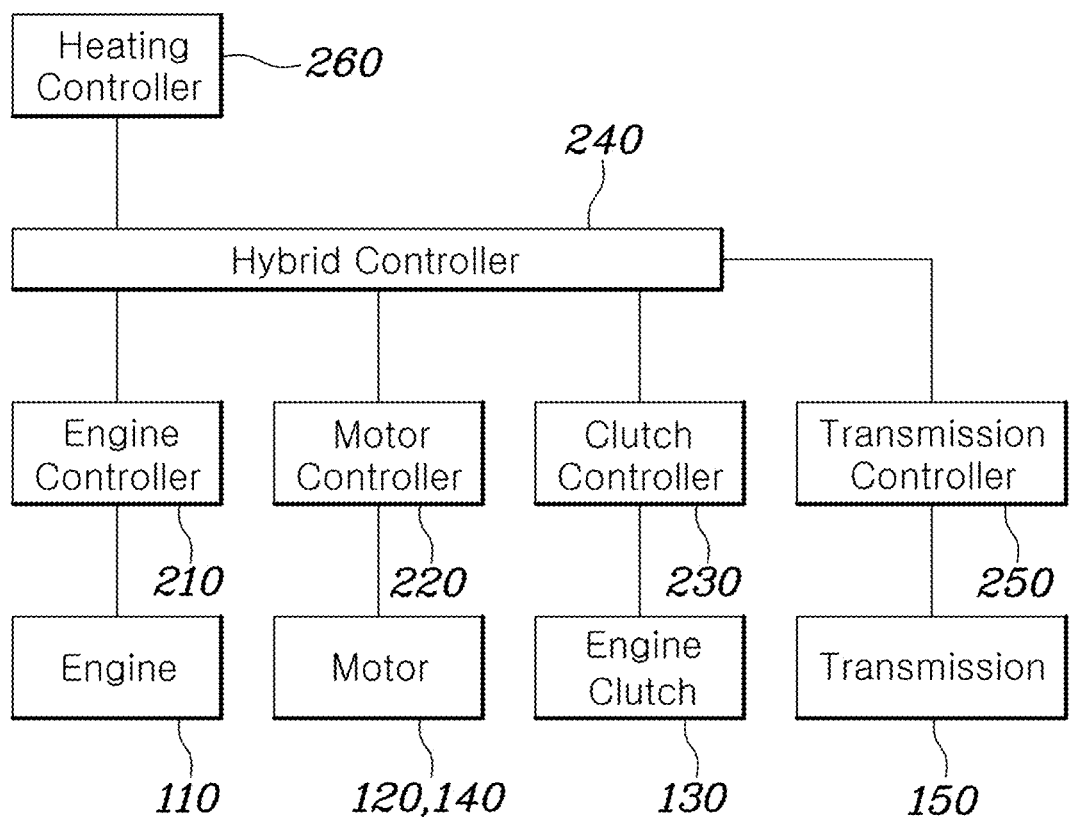
FIG. 2 is a block diagram illustrating a control system configuration of a hybrid electric vehicle according to an exemplary embodiment of the present disclosure.

FIG. 2 is a block diagram illustrating a control system configuration of a hybrid electric vehicle according to an exemplary embodiment of the present disclosure. Referring to FIG. 2, in the hybrid electric vehicle to which embodiments of the present disclosure are applicable, the internal combustion engine 110 may be controlled by an engine controller 210, the torque of each of the starter/generator motor 120 and the drive motor 140 may be controlled by a motor controller 220, e.g., a motor control unit (MCU), and the engine clutch 130 may be controlled by a clutch controller 230. Here, the engine controller 210 is also referred to as an engine management system (EMS). Furthermore, the transmission 150 is controlled by a transmission controller 250.

Regarding embodiments of the present disclosure, a heating controller 260 may determine whether or not the engine is required to be started based on the temperature of cooling water and a target temperature of heating, and control the generation or cancellation of an engine start request according to the result of the determination. For example, the engine start request may be provided by setting a specific signal as "1", and a cancellation request may be provided by setting the corresponding signal as "0". However, these are for illustrative purposes only, and the present disclosure is not limited thereto.

Each of the controllers may be connected to a hybrid controller 240, e.g., a hybrid controller unit (HCU), controlling an overall mode conversion process as a higher-level controller. Under the control of the hybrid controller 240, each controller may provide at least one of information required for engine clutch control during gear shifting and changing of the driving mode and information required for engine stop control to the hybrid controller 240, or perform an operation in response to a control signal.

For example, the hybrid controller 240 determines whether or not to perform conversion between the EV mode and the HEV mode or between a charge depleting (CD) mode and charge sustaining (CS) mode. In this regard, the hybrid controller is configured to determine a point in time at which the engine clutch 130 is to be disengaged (or opened), and performs hydraulic control when the engine clutch 130 is disengaged. Furthermore, the hybrid controller 240 may determine the state of the engine clutch 130 (e.g., the engine clutch 130 being locked-up, slipping, or disengaged), and control a point in time at which the injection of fuel to the engine 110 is to be stopped. Furthermore, the hybrid controller 240 may control the recovery of the rotational energy of the engine by transmitting a torque command for controlling the torque of the starter/generator motor 120 for the engine stop control to the controller 220. Furthermore, the hybrid controller 240 may control a sub-controller configured for determination of a mode conversion condition and the conversion in the case of driving mode conversion control. Regarding embodiments of the present disclosure, the hybrid controller 240 may determine whether or not to start the engine by receiving the engine start request from the heating controller 260 and determine whether or not to maintain the engine in the started state after the cancellation of the engine start request and a time in which the engine is maintained in the started state.

It will be apparent to those skilled in the art that the connection relationship between and the functions/classification of the above-described controllers are illustrative, and the controllers are not limited to the names thereof. For example, the hybrid controller 240 may be configured so that the function of the hybrid controller 240 is replaced by one of other controllers or distributed to two or more of the other controllers.

The above-described configurations of FIG. 1 and FIG. 2 are only example configurations of the hybrid electric vehicle, and it will be apparent to those skilled in the art that the hybrid electric vehicle applicable to various exemplary embodiments of the present disclosure is not limited to those configurations.

Figure 3:
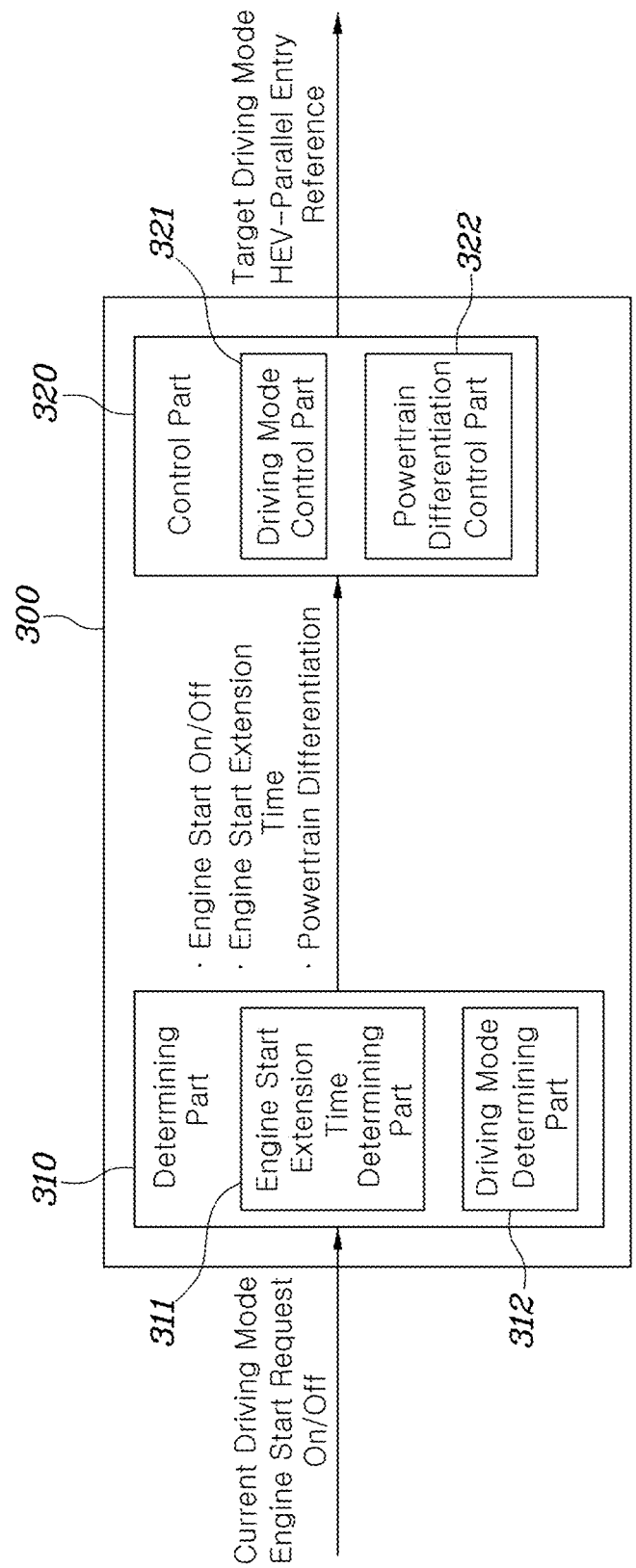
FIG. 3 is a block diagram illustrating a configuration of a driving mode control apparatus for a hybrid electric vehicle according to an exemplary embodiment of the present disclosure.

FIG. 3 is a block diagram illustrating a configuration of a driving mode control apparatus 300 of a hybrid electric vehicle according to an exemplary embodiment of the present disclosure. Referring to FIG. 3, the driving mode control apparatus 300 of a hybrid electric vehicle according to an exemplary embodiment of the present disclosure may have information regarding the current driving mode (e.g., EV+, EV, HEV, and Auto modes) of the vehicle and ON/OFF information of an engine start request as input information. Furthermore, the driving mode control apparatus 300 may have a target driving mode, an HEV-parallel entry reference, and the like as an output value. In the driving mode according to an exemplary embodiment of the present disclosure, the EV (or EV+) mode may be replaced with a charge deplete (CD) mode intended to first use the state of charge (SOC) value of the vehicle as driving energy, and the HEV mode may be replaced with a charge sustain (CS) mode intended to maintain the SOC value of the vehicle.

Furthermore, the driving mode control apparatus 300 of the hybrid electric vehicle may include a determining portion 310 and a control portion 320. The determining portion 310 may include an engine start extension time determining portion 311 and a driving mode determining portion 312. The control portion 320 may include a driving mode control portion 321 and a powertrain differentiation control portion 322.

In some implementations, because the driving mode control apparatus 300 of a hybrid electric vehicle has output values related to powertrain control, the driving mode control apparatus 300 may be implemented as a higher-level controller controlling the overall operation of the powertrain apparatus 100. For example, when the driving mode control apparatus 300 is applied to the hybrid electric vehicle described above with reference to FIG. 1 and FIG. 2, the driving mode control apparatus 300 of the hybrid electric vehicle may be implemented as one function of the hybrid controller 240. However, this is for illustrative purposes only, and the driving mode control apparatus 300 according to an exemplary embodiment of the present disclosure is not limited thereto. In another example, the driving mode control apparatus 300 of a hybrid electric vehicle may be implemented as an autonomous driving controller or a separate controller different from the above-described controllers.

Hereinafter, respective components of the driving mode control apparatus 300 of a hybrid electric vehicle will be described in more detail.

First, the determining portion 310 receives an engine start request generated by the heating controller, and determines a first time between the generation of the engine start request and the cancellation of a previous engine start request based on the received engine start request. In the instant case, the engine start request generated by the heating controller may include all requests, such as a forced CS mode transition request and an HEV mode transition request, which order the engine of the vehicle to be started to increase the temperature of cooling water.

Furthermore, after the first time is determined, the determining portion 310 determines a second time by which the started state of the engine is to extend after the cancellation of the engine start request, based on the determined first time. In the instant case, the determination of the second time may be understood as being performed by the engine start extension time determining portion 311.

The determining portion 310 may determine whether or not to start the engine and a resultant driving mode, based on the engine start request and the second time. This operation may be understood as being performed by the driving mode determining portion 312.

Afterwards, information regarding engine start ON/OFF, an engine start extension time, and powertrain differentiation according to the result of the determination may be transmitted to the control portion. Here, the powertrain differentiation relates to a power transmission method when the engine is started during the second time after the engine start request is cancelled. The powertrain differentiation may be determined by the driving mode determining portion 312.

Furthermore, the control portion 320 receives information regarding the engine start ON/OFF, the engine start extension time, and the powertrain differentiation, and performs an operation of converting or returning the driving mode in response to the start of the engine based on the input information, an operation of moving an HEV-parallel entry line upward according to the powertrain differentiation, and the like. In the instant case, it may be understood that the operation of converting or returning the driving mode is performed by the driving mode control portion 321 and the powertrain differentiation is performed by the powertrain differentiation control portion 322.

When the engine start request is generated by the heating controller, the control portion 320 receives an engine start on signal from the determining portion 310 to start the engine. When the engine start request is cancelled, the control portion 320 may receive an engine start off signal from the determining portion 310, controlling the vehicle to stop the engine and return to the original driving state.

Furthermore, when the engine start request generated by the heating controller is cancelled, the engine may be maintained in the started state. The control portion 320 may control the engine 110 to further maintain the engine in the started state during the second time even after the cancellation of the engine start request by receiving the second time, i.e., the engine start extension time determined by the determining portion 310. When the second time has passed after the cancellation of the engine start request, the engine may be stopped.

Because the engine is further maintained in the started state during the second time even after the cancellation of the engine start request, the temperature of the cooling water is increased by the increased engine start time. Consequently, the heating controller 260 may delay a time at which the next engine start request is generated. As a result, the cycle of the engine start request may be increased, decreasing the frequency at which the engine of the vehicle is repeatedly started and stopped.

Furthermore, when the engine start request is generated, the control portion 320 may convert the driving mode to a specific mode in which the engine is started. In the instant case, even after the cancellation of the engine start request, the engine may be maintained in the started state by the specific mode during the second time. Here, the specific mode in which the engine is started may include the HEV mode.

Meanwhile, the control portion 320 may control the engine 110 to be started in a first mode in which the starter/generator motor 120 performs a charging operation using power from the engine during the second time as in an HEV-series mode. The first mode refers to a power transmission method in which the engine 110 is started in a state in which the engine clutch 130 is disengaged and generated power is used by the starter/generator motor 120 for the charging. In contrast, a second mode, such as an HEV-parallel mode, refers to a power transmission method in which the engine 110 is started in a state in which the engine clutch 130 is engaged and power generated by not only the motor but also the engine is transmitted to wheels of the vehicle. The driving mode control according to an exemplary embodiment of the present disclosure is directed to drive the engine 110 to obtain a cooling water temperature for heating in a situation in which the start of the engine is unnecessary. As the vehicle is operated in the first mode in which the starter/generator motor 120 performs the charging using the power from the engine during the second time through the powertrain differentiation, the temperature of the cooling water may be prevented from decreasing by maintaining the engine in the started state while the engine 110 may be independently started irrespective of the driving speed to be driven at an operating point including the maximum fuel efficiency.

Furthermore, in this regard, the control portion 320 may maintain the engine in the started state through the first mode by raising the entry reference to the second mode in which the power from the engine is transmitted to the wheels. These features will be described below with reference to FIG. 4.

Figure 4:
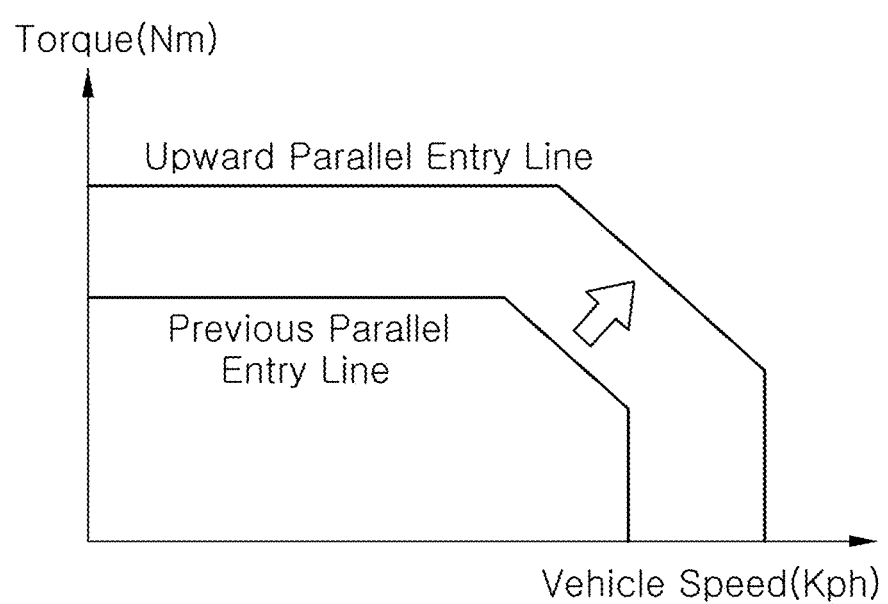
FIG. 4 is a graph illustrating changes in an HEV-parallel entry line according to an exemplary embodiment of the present disclosure.

FIG. 4 is a graph illustrating changes in an HEV-parallel entry line according to an exemplary embodiment of the present disclosure. FIG. 4 illustrates an example of entry reference upward-control to the second mode in which the driving force of the engine is transmitted to wheels by the control portion 320. In the following, the second mode will be referred to as being the HEV-parallel mode as an example. Referring to FIG. 4, the HEV-parallel entry line may be set on a graph in which one axis is a vehicle speed and the other axis is torque. When a driver request torque is above the HEV-parallel entry line, the hybrid electric vehicle transits from the HEV-series mode to the HEV-parallel mode. Thus, when the HEV-parallel entry line is moved upward, the HEV-series mode may be maintained at relatively low required torque when applied to the conventional HEV-parallel entry line, and consequently, the engine may be driven at the operating point having the maximum fuel efficiency.

FIG. 3 and FIG. 4 illustrate the driving mode control configuration and method according to various exemplary embodiments of the present disclosure. Features to which these embodiments are applied will be described below with reference to FIG. 5.

Figure 5:
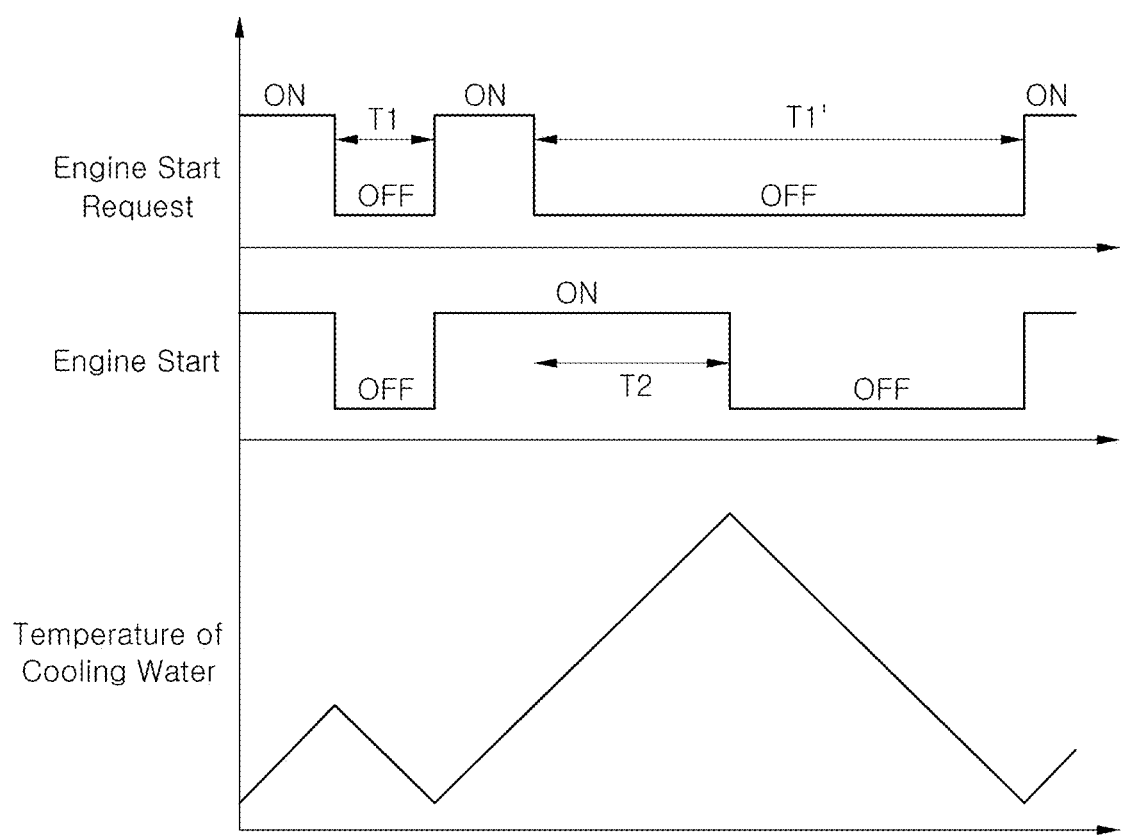
FIG. 5 is a table illustrating aspects according to the driving mode control of a hybrid electric vehicle according to an exemplary embodiment of the present disclosure.

FIG. 5 is a table illustrating aspects according to the driving mode control of a hybrid electric vehicle according to an exemplary embodiment of the present disclosure. Referring to FIG. 5, the engine start request is generated and canceled depending on the temperature of cooling water, and has a relationship in which the temperature of the cooling water increases in an engine start ON state and decreases when the engine is stopped.

Furthermore, it may be appreciated that, in a section except for a second time T2, the aspect of the engine start request is the same as the aspect of the started state of the engine. When the engine start request is in an ON state (i.e., generated) based on the temperature of the cooling water by the heating controller 260, the driving mode control apparatus 300 is configured to control the engine to be in the engine start ON state on the basis thereof. When the engine start request is in an OFF state (i.e., canceled), the driving mode control apparatus 300 is configured to control the engine to be in the engine start OFF state.

However, in a section of the second time T2 determined based on a first time T1, the driving mode control apparatus 300 is configured to control the engine start ON state to be maintained despite the engine start request of the heating controller 260 being in the OFF state. Consequently, in the section of the second time T2, the temperature of the cooling water continuously increases to increase time taken for the heated cooling water to be cooled to a temperature at which the engine start request is generated, increasing a new first time T1' between the cancellation of the current engine start request and the generation of the next engine start request.

Because the first time is the same as the cycle of the engine start request, the period of the engine start request is consequently increased, reducing the frequency of the conversion of the driving mode.

Meanwhile, the foregoing description is based on the assumption that the second time is determined by the determining portion 310 of the driving mode control apparatus 300, and the second time will be described in detail below with reference to FIG. 6.

Figure 6:
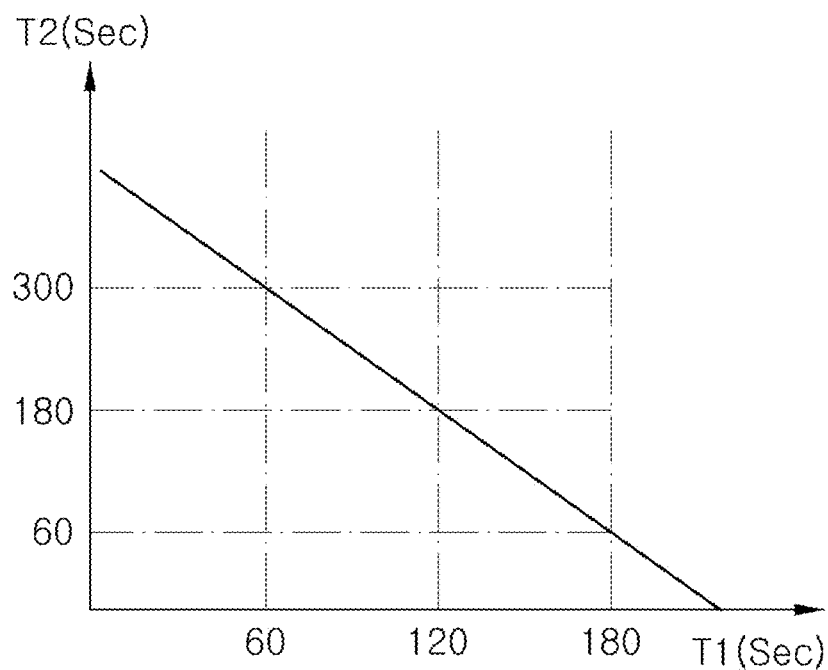
FIG. 6 is a graph illustrating the relationship between a first time and a second time according to an exemplary embodiment of the present disclosure.

FIG. 6 is a graph illustrating the relationship between the first time and the second time according to an exemplary embodiment of the present disclosure. The second time may be determined to increase with decreases in the first time. Referring to FIG. 6, the graph may be represented as a graph having a negative slope, with the first time T1 and the second time T2 being axes. Numerical values on the graph are examples, and specific values thereof may be determined by vehicle tests. A situation in which the first time and the second time are in the inverse proportional relationship may also be included.

The graphs of the second time and the first time is as illustrated in FIG. 6, the value of the second time T2 may be 0 when the first time T1 has a maximum value. When the second time T2 is 0, the engine is not maintained in the started state by the driving mode control apparatus 300 after the engine start request of the heating controller 260 is cancelled. In other words, when the cycle of the engine start request is sufficiently increased with decreases in the frequency of the engine start request of the heating controller 260, the ON/OFF state of the engine start request is identical with the engine start ON/OFF state as in general situations.

As the value of the first time T1 is smaller, the temperature of the cooling water more rapidly decreases after the engine start OFF state. Thus, the value of the second time T2 is caused to increase with decreases in the value of first time T1, increasing the temperature of the cooling water by a value matching the second time T2 through the engine start. Consequently, it is possible to delay time taken for the cooling water to be cooled again after the second time T2 has passed. By determining the second time in the present manner, it is possible to properly adjust the cycle of the conversion of the engine start request and the driving mode by reflecting the rate of decrease of the temperature of the cooling water.

Figure 7:
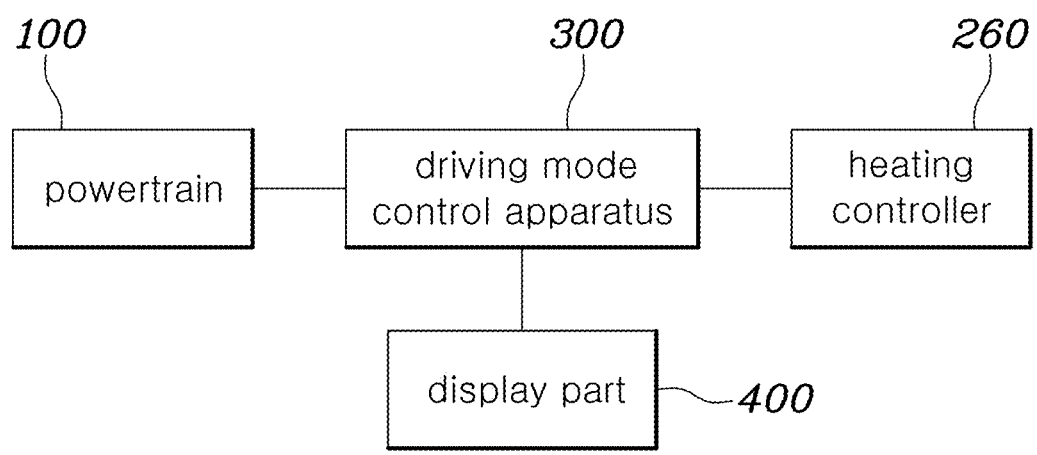
FIG. 7 is a view exemplarily illustrating the configuration of a hybrid electric vehicle according to an exemplary embodiment of the present disclosure.

FIG. 7 is a view exemplarily illustrating the configuration of a hybrid electric vehicle according to an exemplary embodiment of the present disclosure. Referring to FIG. 7, the hybrid electric vehicle according to an exemplary embodiment of the present disclosure includes: the heating controller 260 controlling generation or cancellation of an engine start request based on a temperature of cooling water; the driving mode control apparatus 300 controlling the powertrain apparatus 100; and a display portion 400. Hereinafter, respective components will be described.

First, when the temperature of the cooling water has a value equal to or lower than a temperature required for heating, the heating controller 260 may generate the engine start request. When the cooling water is heated to have a sufficient temperature, the heating controller 260 may cancel the engine start request.

The driving mode control apparatus 300 includes: the determining portion 310 determining a second time based on a first time between the generation of the engine start request and the cancellation of a previous engine start request when the engine start request is generated by the heating controller 260 of the vehicle while the vehicle is driving in a state in which the engine is not started; and the control portion 320 controlling the engine 110 so that the engine is further maintained in the started state during the second time after the engine start request is cancelled.

The hybrid electric vehicle according to an exemplary embodiment of the present disclosure may further include the display portion 400. When the engine is started at the engine start request generated by the heating controller 260, the display portion 400 displays engine start information including at least one of an engine start reason, a current driving mode, or a combination thereof. The display portion 400 may maintain displaying the engine start information during the second time after the engine start request is canceled. The display portion 400 may be implemented as a cluster provided in the vehicle.

Displaying the engine start information may prevent a driver from being embarrassed by sudden engine start in a situation in which there is no operation to the engine and inform the driver of the current state of the vehicle. Furthermore, because the display of the engine start information is maintained without being changed during the second time even after the engine start request is cancelled, it is possible to prevent continuous display of the engine start information from distracting the driver the driving the vehicle or causing the driver inconvenience.

Hereinafter, the above-described driving mode control process will be described with reference to FIG. 8.

Figure 8:
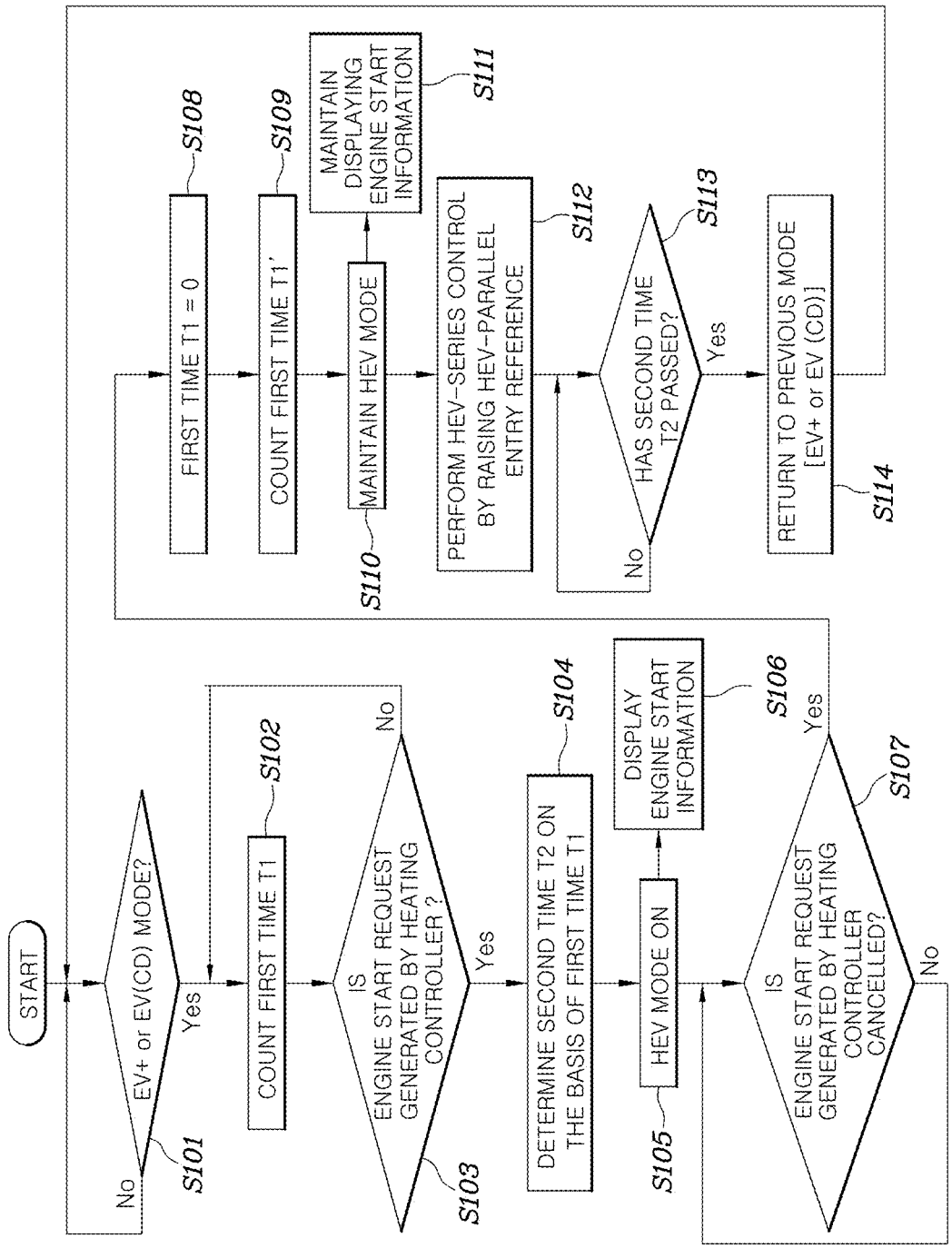
FIG. 8 is a flowchart illustrating a driving mode control method of a hybrid electric vehicle according to an exemplary embodiment of the present disclosure.

FIG. 8 is a flowchart illustrating a driving mode control method of a hybrid electric vehicle according to an exemplary embodiment of the present disclosure. The driving mode control method of a hybrid electric vehicle according to an exemplary embodiment of the present disclosure includes: a step of determining a second time based on a first time between generation of an engine start request and cancellation of a previous engine start request when the engine start request is generated by the heating controller 260 of a vehicle while the vehicle is driving in a state in which the engine is not started; and a step of controlling the engine 110 so that the engine is further maintained in the started state during the second time after the cancellation of the engine start request. Hereinafter, the driving mode control method according to an exemplary embodiment of the present disclosure will be described in more detail with reference to FIG. 9.

The heating controller 260 or the determining portion 310 of the driving mode control apparatus 300 may determine whether or not the vehicle is driving in the state in which the engine is not started as in the EV (or EV+) mode in S101. When the vehicle is driving by starting the engine as in the HEV mode, a control operation for starting the engine or changing the driving mode is not necessary. Thus, the driving mode control according to an exemplary embodiment of the present disclosure may be suitably applied when the vehicle is driving in the driving mode in which the engine is not started.

Afterwards, when the vehicle is determined to be in the EV (or EV+) mode (Yes in S101), the determining portion 310 of the driving mode control apparatus 300 starts counting the first time from the cancellation of the previous engine start request in S102. When the engine start request is generated by the heating controller 260 (Yes in S103), the determining portion 310 determine the second time based on the first time counted before the generation of the engine start request in S104.

In the instant case, the determining portion 310 may determine the value of the second time so that the first time and the second time have a negative correlation. Thus, the time during which the engine is started may be increased with decreases in the cycle of the engine start request of the heating controller 260, allowing the cooling water to be more heated. As a result, the generation of the next engine start request may be delayed.

When the engine start request is generated by the heating controller 260 in S103, the control portion 320 of the driving mode control apparatus 300 is configured to control the powertrain apparatus 100 so that the engine 110 is started. This may be performed by step S105 of converting, by the control portion 320, the driving mode to the HEV mode in which the engine is started. When the driving mode is converted to the HEV mode, engine start information including at least one of an engine start reason, a current driving mode, or a combination thereof may be displayed on the display portion 400 in S106.

After the driving mode is converted to the HEV mode in S105, when the engine start request generated by the heating controller 260 is canceled (Yes in S107), counting the first time is stopped in S108. In S109, the first time is counted again from a point in time of the cancellation. Even when the engine start request generated by the heating controller 260 is canceled, the HEV mode is maintained when the second time has not passed in S110. Displaying the engine start information by the display portion 400 is maintained during the second time despite the engine start request is cancelled.

In the process S110 of maintaining the HEV mode after the cancellation of the engine start request, the HEV-parallel entry line may be adjusted by the control portion 320. Consequently, the HEV-parallel entry reference may be moved upward, preventing the HEV mode from being converted to the HEV-parallel mode during the second time and maintaining the HEV mode in the HEV-series mode in S111.

After the cancellation of the engine start request of the heating controller 260, when the second time has passed during the maintaining of the HEV mode (Yes in S112), the engine is stopped by the control portion 320, and the method returns to the previous driving mode in the state in which the engine is not started as in the EV (or EV+) mode in S113.

After the present process S113, the method returns to the step S101 of determining whether or not the vehicle is driving in the state in which the engine is not started in S114. When respective steps are performed again, a first time T1', i.e., the cycle of the engine start request of the heating controller 260, is increased by the driving mode control according to an exemplary embodiment of the present disclosure, and the second time determined based on the first time T1' is decreased.

The hybrid electric vehicle and the driving mode control method and apparatus for the same according to an exemplary embodiment of the present disclosure can prevent the driving mode from being frequently converted in a short time.

Accordingly, it is possible to prevent the problem in that the popping-up of the cluster, sound, or the like caused by the conversion of the driving mode may distract the concentration of the driver or cause the driver inconvenience. In the present manner, the satisfaction of use of the hybrid electric vehicle may be increased, improving the product quality of the hybrid electric vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving mode control method of a hybrid electric vehicle, the method comprising:
    when an engine start request is generated by a heating controller of the vehicle while the vehicle is driving in a state in which an engine of the vehicle is not started, determining a second time based on a first time between cancellation of a previous engine start request and the generation of the engine start request; and
    controlling, by a control portion, the engine so that the engine is further maintained in a started state during the second time after the cancellation of the engine start request.

2. The method of claim 1, wherein the determination of the second time includes determining the second time to increase with decreases in the first time.

3. The method of claim 1, further including:
    when the engine start request is generated by the heating controller, converting, by the control portion, a driving mode of the vehicle to a predetermined mode in which the engine is started,
    wherein the controlling of the engine includes maintaining the engine in the started state by the predetermined mode during the second time.

4. The method of claim 3, wherein the maintaining of the engine in the started state by the predetermined mode is performed in a first mode in which a starter/generator motor of the vehicle charges with power from the engine during the second time.

5. The method of claim 4, wherein the maintaining of the engine in the started state by the predetermined mode includes raising a reference of entry to a second mode in which driving force from the engine is transmitted to wheels of the vehicle.

6. The method of claim 1, further including:
    stopping, by the control portion, the engine when the second time has passed after the engine start request generated by the heating controller is cancelled.

7. The method of claim 1, further including:
    when the engine is started at the engine start request generated by the heating controller, displaying engine start information including at least one of an engine start reason, a current driving mode, or a combination thereof; and
    maintaining the displaying of the engine start information during the second time after the engine start request is cancelled.

8. A driving mode control apparatus for a hybrid electric vehicle, the apparatus comprising:
    a determining portion configured for determining a second time based on a first time between cancellation of a previous engine start request and generation of an engine start request when the engine start request is generated by a heating controller of the vehicle while the vehicle is driving in a state in which an engine of the vehicle is not started; and
    a control portion configured for controlling the engine so that the engine is further maintained in a started state during the second time after the cancellation of the engine start request.

9. The apparatus of claim 8, wherein the determining portion is configured to determine the second time to increase with decreases in the first time.

10. The apparatus of claim 8, wherein the control portion is configured to convert a driving mode to a predetermined mode in which the engine is started when the engine start request is generated by the heating controller, and to maintain the engine in the started state by the predetermined mode during the second time.

11. The apparatus of claim 10, wherein the control portion is configured to maintain the engine in the started state by a first mode in which a starter/generator motor of the vehicle charges with power from the engine during the second time.

12. The apparatus of claim 11, wherein the control portion is configured to maintain the engine in the started state by the first mode by raising a reference of entry to a second mode in which driving force from the engine is transmitted to wheels of the vehicle.

13. The apparatus of claim 8, wherein the control portion is configured to stop the engine when the second time has passed after the engine start request generated by the heating controller is cancelled.

14. A hybrid electric vehicle comprising:
    a powertrain apparatus including an engine;
    a heating controller configured for controlling generation or cancellation of an engine start request based on a temperature of cooling water; and
    a driving mode control apparatus configured for controlling the powertrain apparatus,
    wherein the driving mode control apparatus includes:
        a determining portion configured for determining a second time based on a first time between cancellation of a previous engine start request and generation of an engine start request when the engine start request is generated by the heating controller of the vehicle while the vehicle is driving in a state in which the engine of the vehicle is not started; and
        a control portion configured for controlling the engine so that the engine is further maintained in a started state during the second time after the cancellation of the engine start request.

15. The hybrid electric vehicle of claim 14, wherein the control portion is configured to convert a driving mode to a predetermined mode in which the engine is started when the engine start request is generated by the heating controller, and to maintain the engine in the started state by the predetermined mode during the second time.

16. The hybrid electric vehicle of claim 15, wherein the control portion is configured to maintain the engine in the started state by a first mode in which a starter/generator motor of the vehicle charges with power from the engine during the second time.

17. The hybrid electric vehicle of claim 16, wherein the control portion is configured to maintain the engine in the started state by the first mode by raising a reference of entry to a second mode in which driving force from the engine is transmitted to wheels of the vehicle.

18. The hybrid electric vehicle of claim 14, wherein the control portion is configured to stop the engine when the second time has passed after the engine start request generated by the heating controller is cancelled.

19. The hybrid electric vehicle of claim 14, further including:
- a display portion configured for displaying engine start information including at least one of an engine start reason, a current driving mode, or a combination thereof,
- wherein the display portion maintains displaying the engine start information during the second time after the engine start request is cancelled.

* * * * *